United States Patent [19]
Yamaguchi

[11] Patent Number: 5,291,349
[45] Date of Patent: Mar. 1, 1994

[54] TAPE RECORDER AND REPRODUCER MACHINE

[75] Inventor: Masato Yamaguchi, Kanagawa, Japan

[73] Assignee: Sony Corporation, Tokyo, Japan

[21] Appl. No.: 904,581

[22] Filed: Jun. 26, 1992

[30] Foreign Application Priority Data

Jul. 3, 1991 [JP] Japan .................. 3-188278

[51] Int. Cl.$^5$ .............................................. G11B 15/00
[52] U.S. Cl. ...................................... 360/84; 360/96.5
[58] Field of Search .................................. 360/84, 96.5

[56] References Cited

U.S. PATENT DOCUMENTS

| | | | |
|---|---|---|---|
| 4,870,517 | 9/1989 | Maehara et al. | 360/96.5 |
| 5,005,091 | 4/1991 | Tsujimoto | 360/96.5 |
| 5,105,317 | 4/1992 | Sugiyama et al. | 360/96.5 X |
| 5,162,956 | 11/1992 | Emori et al. | 360/96.5 |

FOREIGN PATENT DOCUMENTS 236169  10/1987  Japan .................. 360/96.5

*Primary Examiner*—Richard E. Gluck
*Attorney, Agent, or Firm*—Lewis H. Eslinger; Jay H. Maioli

[57] ABSTRACT

A tape recorder and reproducer machine has a rotatable head drum carrying a plurality of heads for recording a signal onto a cassette-type magnetic tape and for reproducing the signal recorded on a cassette-type magnetic tape. The machine comprises a cassette chamber for receipt of a tape cassette, a protective member movable between first and second positions, and a drive for moving the protective member to the first position between the cassette chamber and the head drum to protect the head drum from damage when the tape cassette is to be placed into or discharged from the cassette chamber. The drive moves the protective member from the first position to the second position allowing access from the head drum to the magnetic tape when the tape cassette is received in the cassette chamber.

2 Claims, 10 Drawing Sheets

TAPE RECORDER AND REPRODUCER MACHINE

BACKGROUND OF THE INVENTION

This invention relates to a tape recorder and reproducer machine including a rotatable head drum carrying a plurality of heads for recording a signal onto a cassette-type magnetic tape and for reproducing the signal recorded on a cassette-type magnetic tape.

In video or digital audio tape recorder and reproducer machines, a length of magnetic tape is transported pass a rotatable head drum. The magnetic tape is housed in a cassette from which a portion of the magnetic tape is transported around the drum in skewed fashion so that the magnetic tape is in close proximity with just over 180° of the drum circumference. The skew of the magnetic tape is such that as the drum rotates, the heads affixed to the drum will traverse the width of the magnetic tape defining paths or tracks which cross the magnetic tape at an acute angle with respect to the length of the magnetic tape. For the purpose of such tape loading, it is the current practice to place the tape cassette in a cassette chamber defined in front of the head drum. In order to reduce the size of the tape recorder and reproducer machine, the cassette chamber must be positioned as closed to the head drum as possible. When the cassette chamber is positioned at a short distance from the head drum, however, the head drum can be damaged by the tape cassette placed into or discharged from the cassette chamber. It may be considered to use a cassette carrier to place the tape cassette into the cassette chamber and discharge it from the cassette chamber. However, the cassette carrier requires a complex mechanism and a space therefor, resulting in a complex, expensive and space consuming tape recorder and reproducer machine.

SUMMARY OF THE INVENTION

Therefore, it is a main object of the invention to provide a compact, simple and inexpensive tape recorder and reproducer machine which can reduce the distance of a cassette chamber from a head drum.

There is provided, in accordance with the invention, a tape recorder and reproducer machine including a rotatable head drum carrying a plurality of heads for recording a signal onto a cassette-type magnetic tape and for reproducing the signal recorded on a cassette-type magnetic tape. The machine comprises a cassette chamber for receipt of a tape cassette, a protective member movable between first and second positions, and drive means for moving the protective member to the first position between the cassette chamber and the head drum to protect the head drum from damage when the tape cassette is to be placed into or discharged from the cassette chamber. The drive means moves the protective member from the first position to the second position allowing access from the head drum to the magnetic tape when the tape cassette is received in the cassette chamber.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
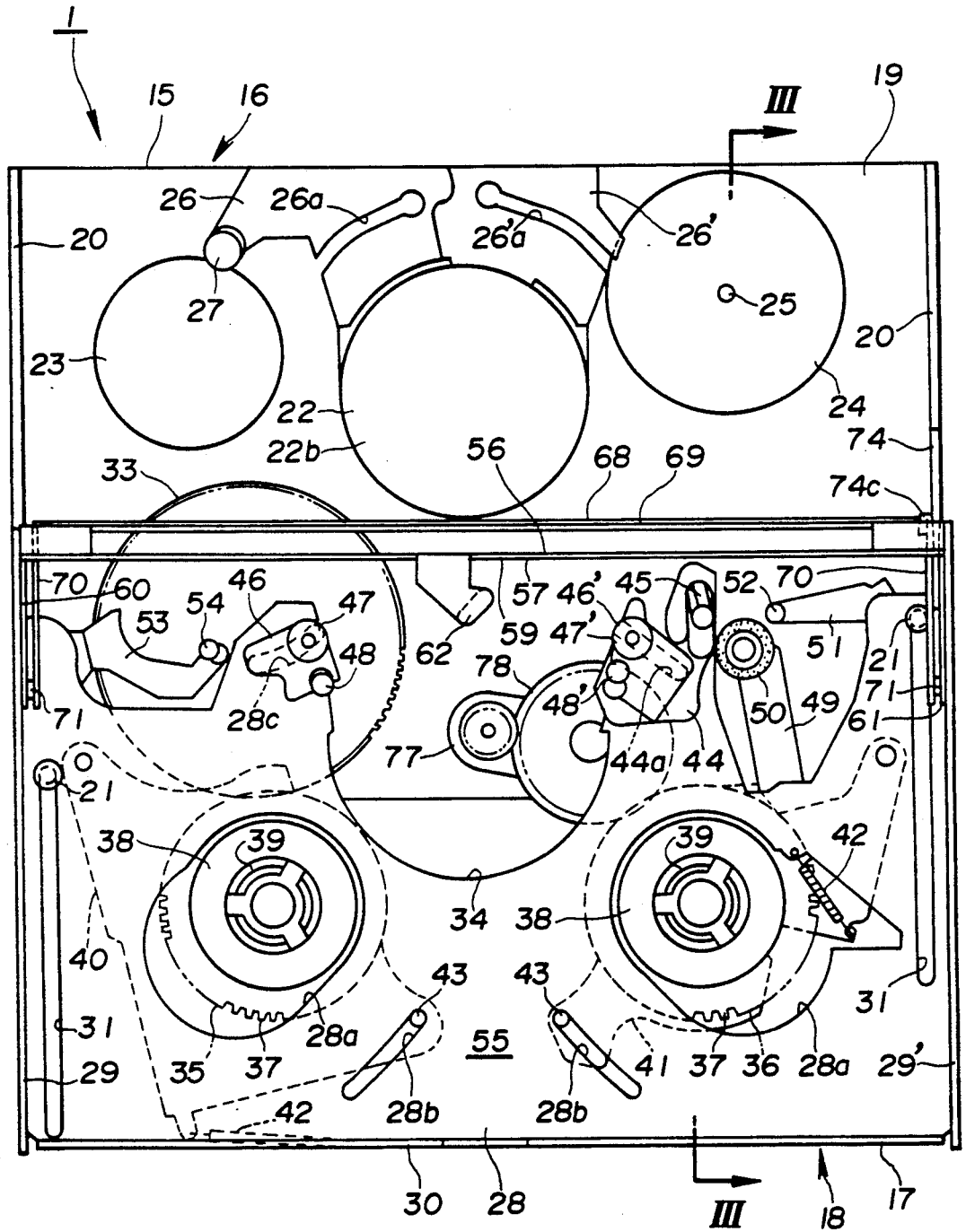
FIG. 1 is a plan view showing one embodiment of a tape recorder and reproducer machine made in accordance with the invention.
Figure 2:
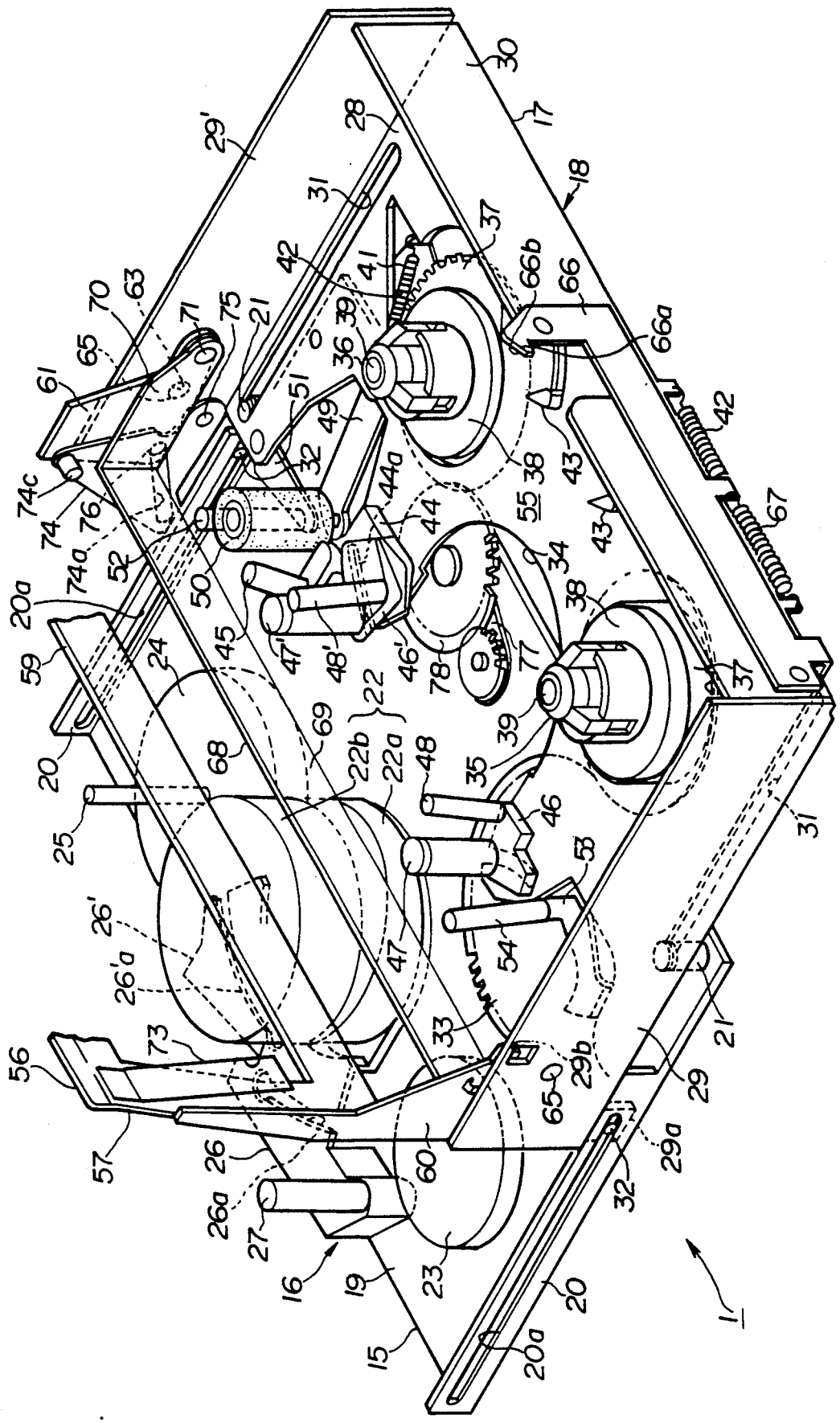
FIG. 2 is a perspective view showing the tape recorder and reproducer machine of the invention with the movable chassis in the extruded position.
Figure 3:
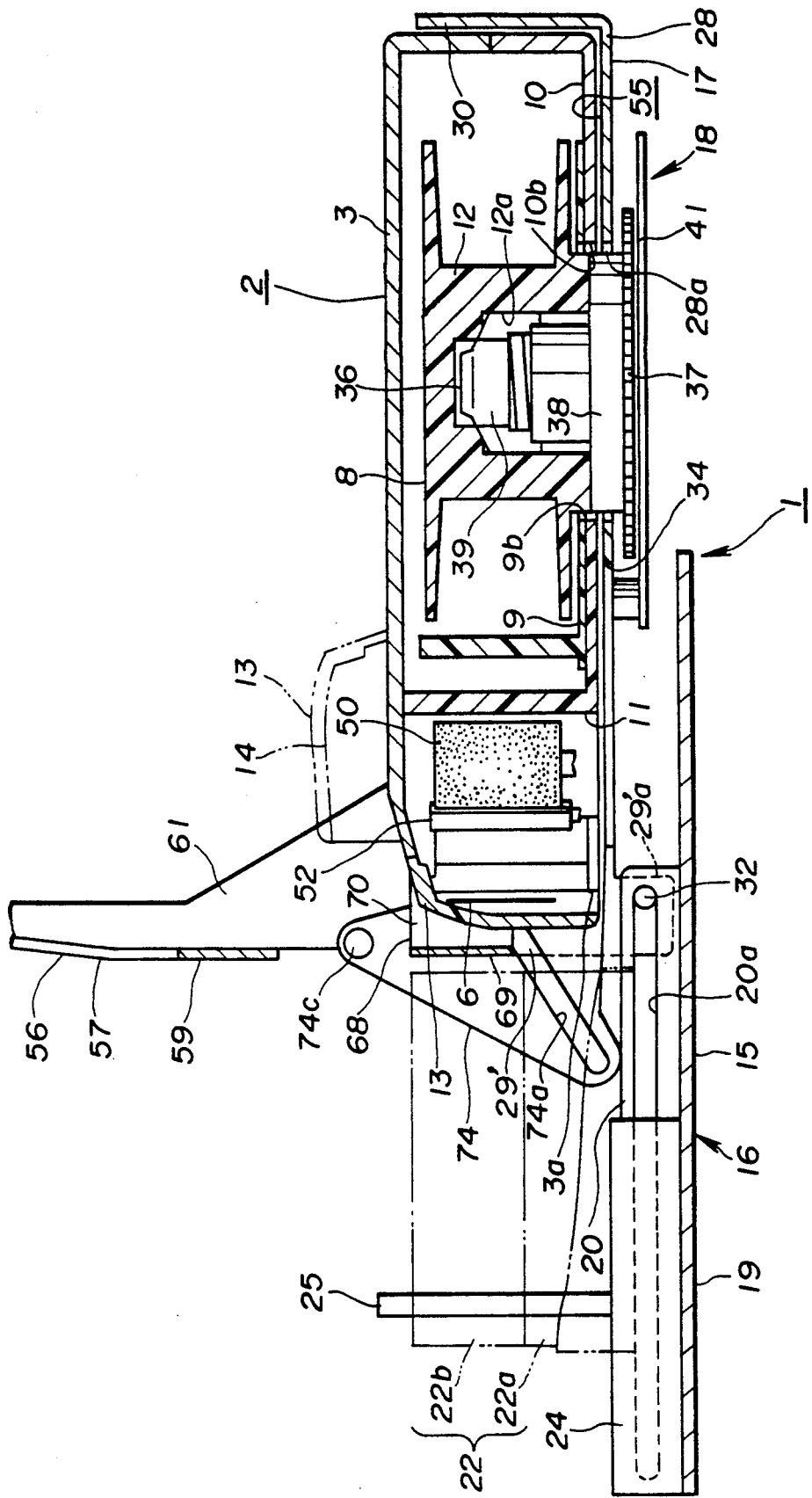
FIG. 3 is an enlarged sectional view taken along the line III—III of FIG. 1 with the cassette cover in the open position.
Figure 4:
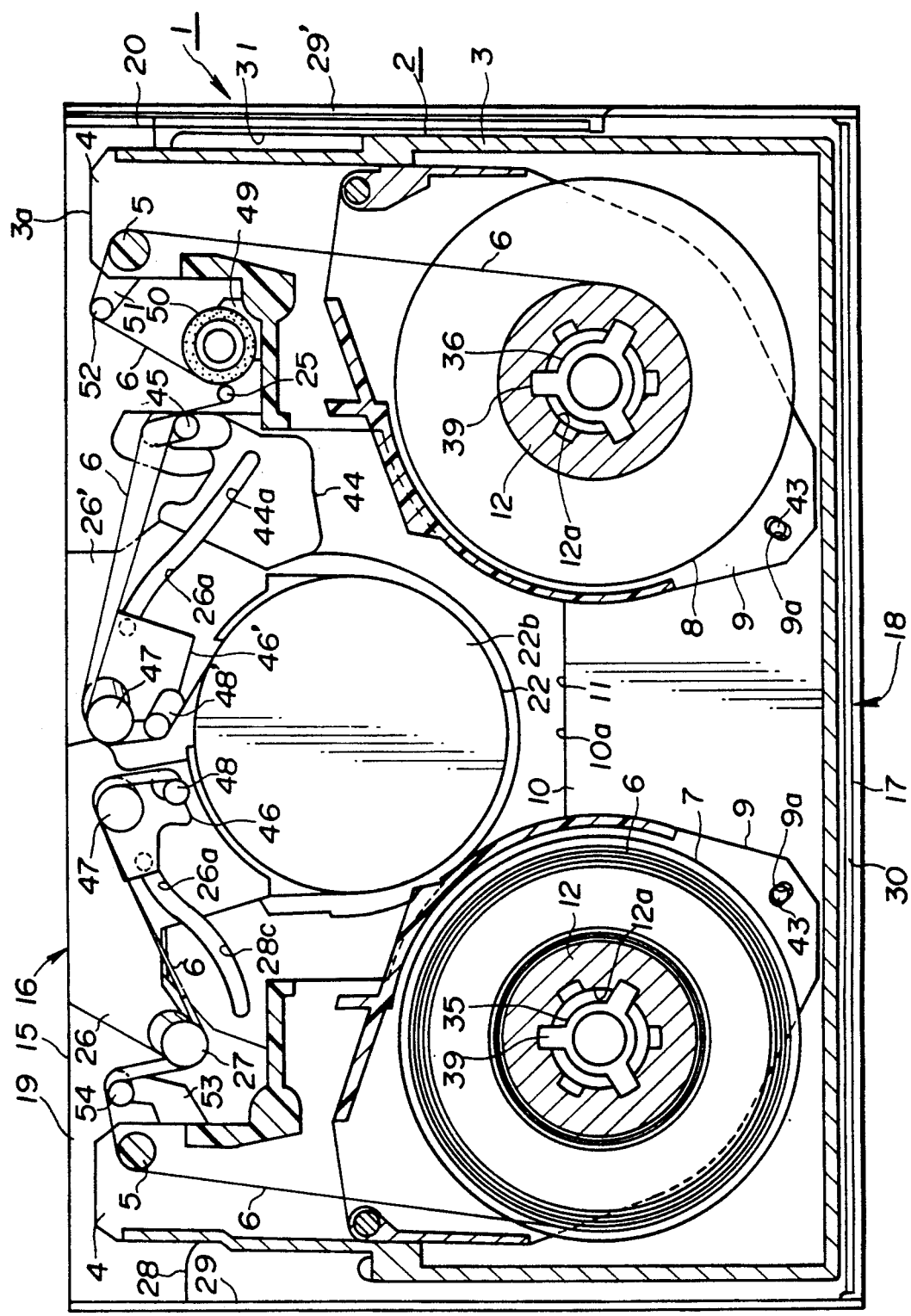
FIG. 4 is an enlarged plan view of the tape recorder and reproducer machine of the invention with the movable chassis in the retracted position.
Figure 5:
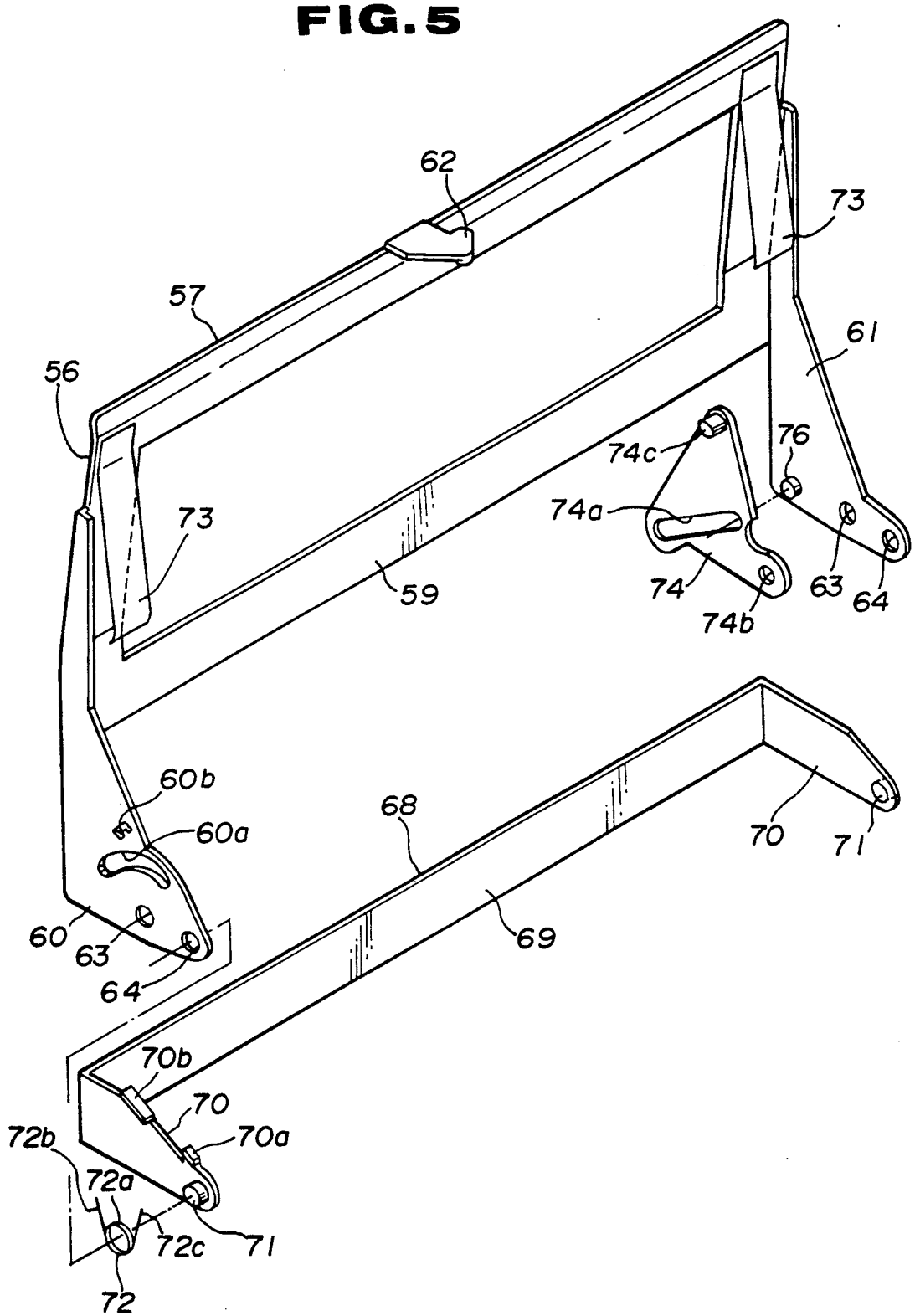
FIG. 5 is an enlarged perspective view showing the protective member in connection with the cassette cover.

With reference to the drawings, wherein like numerals refer to like parts in the several views, and in particular to FIGS. 1 through 5, there is shown a video tape recorder and reproducer machine embodying the invention. The video tape recorder and reproducer machine, generally designated by the numeral 1, will be described in connection with an 8 mm video tape cassette 2. The video tape cassette 2 comprises a two-part cassette casing 3 which is composed of two interconnected rectangular casing parts. The cassette casing 3 is formed in its front edge 3a with tape ports 4 each of which has a guide pole 5 extending between the two casing parts for guiding a magnetic tape 6. The cassette casing 3 has a bottom plate 10 for supporting first and second spools 7 and 8 between which the magnetic tape 6 is spooled. The bottom plate 10 has a trapezoid cutout 10a and two elongated spool holes 10b. The first and second spools 7 and 8 are supported on respective spool support plates 9. Each of the spool support plates 9, which is pivoted at its one end to the bottom plate 10 and formed at the other end thereof with an elongated hole 9a, has a circular spool hole 9b. The first spool 7 is supported rotatably on the first spool support plate 9 with its lower end placed in the circular spool hole 9b of the first spool support plate 9. The lower end of the first spool 7 extends outward through the first elongated spool hole 10b of the bottom plate 10, as shown in FIG. 3. Similarly, the second spool 8 is supported rotatably on the second speed support plate 9 with its lower end placed in the circular spool hole 9b of the second spool support plate 9. The lower end of the second spool 7 extends outward through the second elongated spool hole 10b of the bottom plate 10, as shown in FIG. 3. The first and second spool support plates 9 are rotated between first and second positions. At the first position of the first and second spool support plates 9, the first and second spools 7 and 8 are spaced at a standard distance predetermined for 8 mm video tape cassettes. At the second position, as shown in FIG. 4, the distance between the first and second spools 7 and 8 is somewhat longer than the standard distance.

The tape cassette 2 has a pivotal door 13 secured to the cassette casing 3 for rotation between a closed position, as indicated by the full lines of FIG. 3, and an open position, as indicated by the two-dotted lines of FIG. 3. The pivotal door 13 covers the front edge 3a of the cassette casing 3 at its closed or full line position and uncovers the front edge 3a of the cassette casing 3 so as to allow access to the magnetic tape 6 at its open or two-dotted line position. The pivotal door 13 is urged and held at its closed position by resilient means (not shown). When the tape cassette 2 is placed in the video tape recorder and reproducer machine 1, the pivotal door 13 is at the closed position to cover the front edge 3a of the cassette casing 3 and the first and second spools 7 and 8 are at the standard positions.

The video tape recorder and reproducer machine 1 comprises a fixed section 16 and a movable section 18. The fixed section 16 includes a fixed chassis 15 one size larger than the tape cassette 2. The movable section 18 includes a slidable chassis 17 supported on the fixed chassis 15 for sliding movement with respect to the fixed chassis 15. The fixed chassis 15 has a flat portion 19 and turned side portions 20 each of which has a guide slot 20a extending in the horizontal direction and a pair of poles 21 extending upward therefrom. The poles 21 have a length about one-third of the height of the tape cassette 2. The fixed chassis 15 supports a head drum 22 comprised of a pair of cylindrical-shaped drums 22a and 22b. The lower drum 22a is rigidly affixed to the flat portion 16 of the fixed chassis 15, and the upper drum 22b is rotatably supported on the lower drum 22a. A plurality of record/playback heads (not shown) are mounted on the lower portion of the upper drum 22b. The record/playback heads move along the outer peripheral surface of the head drum 22 with respect to the lower drum 22a with rotation of the upper drum 22b effectuated by a drive motor (not shown) during recording or playback. The fixed chassis 15 supports a main motor 23 on one side of the head drum 22 and a capstan motor 24 on the other side of the head drum 22. The capstan motor 24 has a capstan 25 extending upward therefrom. The numerals 26 and 26' designate a pair of guide members for guiding respective tape loading blocks 46 and 46' to be described later. The guide members 26 and 26' are inclined at an angle with respect to the fixed chassis 15 and positioned substantially in contact with the rear side of the head drum 22.

The slidable chassis 17 has a flat portion 28 supported for sliding movement with respect to the fixed chassis 15 at a position somewhat higher than the flat portion 19 of the fixed chassis 15. For this purpose, the slidable chassis 17 has turned side portions 29 and 29' and a turned front portion 30. The turned portions 29, 29' and 30 have a height substantially equal to the height of the tape cassette 2. The flat portion 28 of the slidable chassis 17 is formed near its opposite side edges with guide slots 31 in which the respective poles 21 are inserted slidably.

The turned side portion 29 has a leg 29a extending downward therefrom. The leg 29a has a pin 32 inserted slidably in the guide slot 20a. Similarly, the turned side portion 29' has a leg 29'a extending downward therefrom. The leg 29'a has a pin 32 inserted slidably in the guide slot 20a. The slidable chassis 17 are supported for sliding movement with respect to the fixed chassis 15 between retracted and extruded positions. At the extruded position, the slidable chassis 17 is extruded from the fixed chassis 15, as shown in FIGS. 1 and 2. At the retracted position, the slidable chassis 17 is retracted into the fixed chassis 15, as shown in FIG. 4. Movement of the slidable chassis 17 is effectuated by an unshown drive mechanism including a cam gear 33.

The slidable chassis 17 is formed in its flat portion 28 with a U-shaped cutout 34 in which the head drum 22 is placed when the slidable chassis 17 is in its retracted position, as shown in FIG. 4. The first and second spools 7 and 8 are supported on first and second spool tables 35 and 36, respectively. The first spool table 35 has a spur gear portion 37, a disc-shaped spool support portion 38 positioned at a height somewhat higher than the height of the spur gear portion 37, and a center shaft portion 39 extending upward from the support portion 38 for engagement with the first spool 7. The first spool table 35 is secured on a first lever 40 with the spool support portion 38 being positioned above the flat portion 28 of the slidable chassis 17. The first lever 40 is pivoted at its one end on the flat portion 28 of the slidable chassis 17 and provided at the other end thereof with a pin 43 inserted slidably in an arched guide groove 28b formed in the flat portion 28 of the slidable chassis 17 so that the first lever 40 can bring the first spool table 35 between the first and second positions. A tension spring 42 is provided between the first lever 40 and the slidable chassis 17 to urge the first lever 40 toward the first position, as shown in FIG. 1. Rotation of the first lever 40 is effectuated by the drive mechanism including the cam gear 33. The second spool table 36 has a spur gear portion 37, a disc-shaped spool support portion 38 positioned at a height somewhat higher than the height of the spur gear portion 37, and a center shaft portion 39 extending upward from the support portion 38 for engagement with the second spool 8. The second spool table 36 is secured on a second lever 41 with the spool support portion 38 being positioned above the flat portion 28 of the slidable chassis 17. The second lever 41 is pivoted at its one end on the flat portion 28 of the slidable chassis 17 and provided at the other end thereof with a pin 43 inserted slidably in an arched guide groove 28b formed in the flat portion 28 of the slidable chassis 17 so that the second lever 41 can bring the second spool table 36 between the first and second positions. A tension spring 42 is provided between the second lever 41 and the slidable chassis 17 to urge the second lever 40 toward the first position, as shown in FIG. 1. Rotation of the second lever 41 is effectuated by the drive mechanism including the cam gear 33. The first and second levers 40 and 41 are positioned at a height somewhat lower than the flat portion 28 of the slidable chassis 17.

Figure 6:
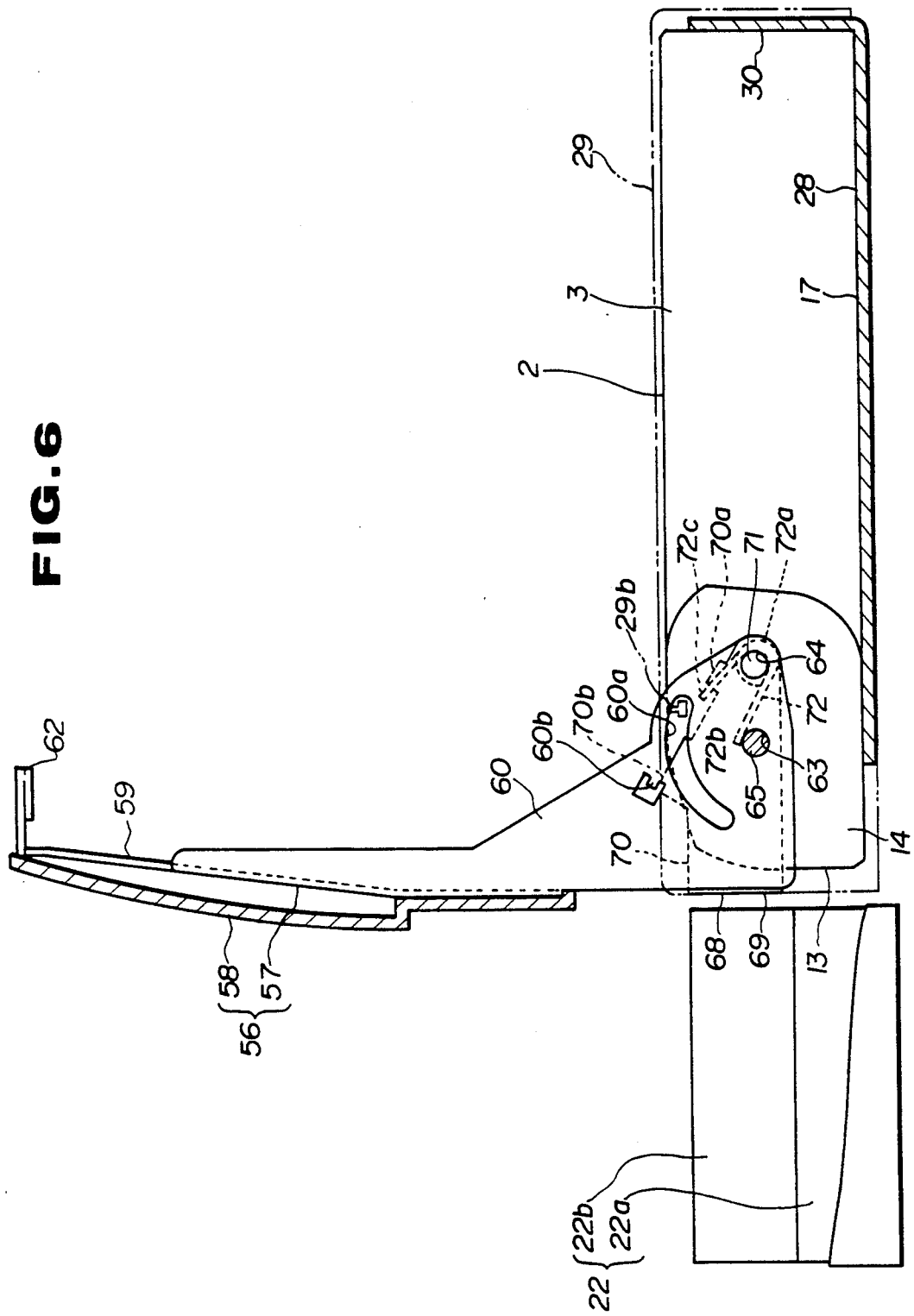
FIG. 6 is an enlarged side view partly in section showing the significant portion of the tape recorder and reproducer machine of the invention with the cassette cover in the open position.
Figure 8:
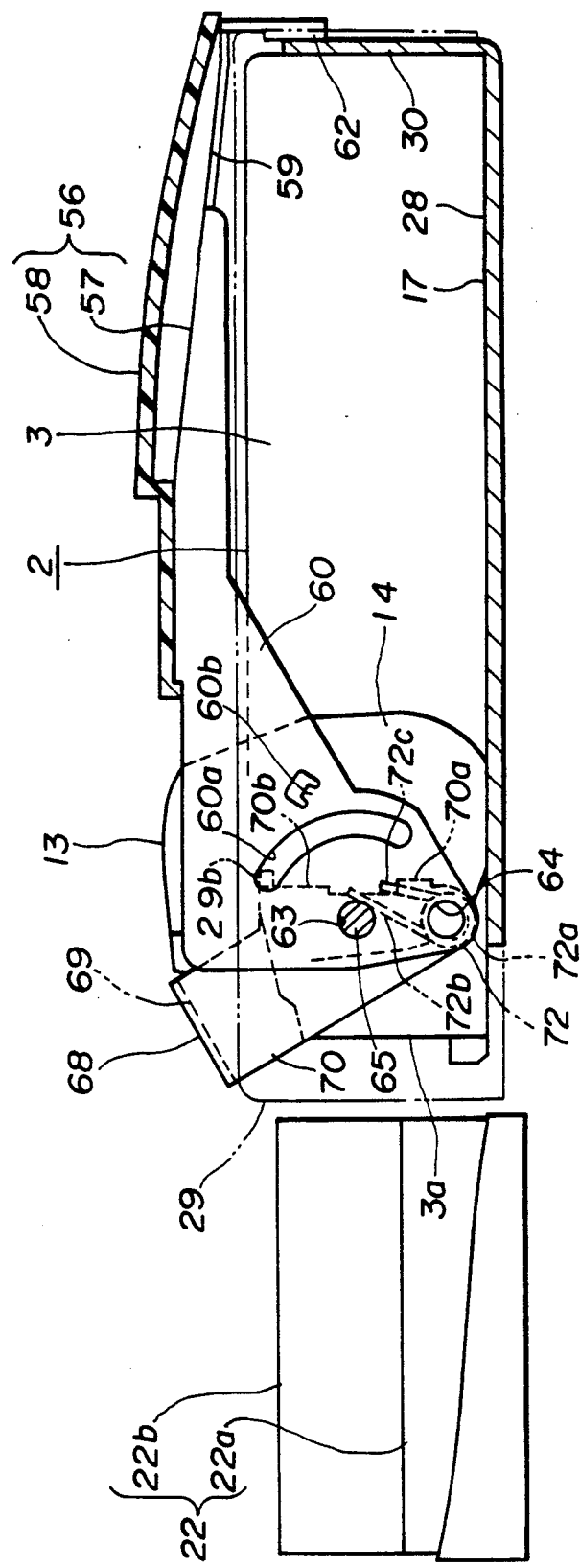
FIG. 8 is an enlarged side view partly in section showing the significant portion of the tape recorder and reproducer machine of the invention with the cassette cover in the closed position.
Figure 9:
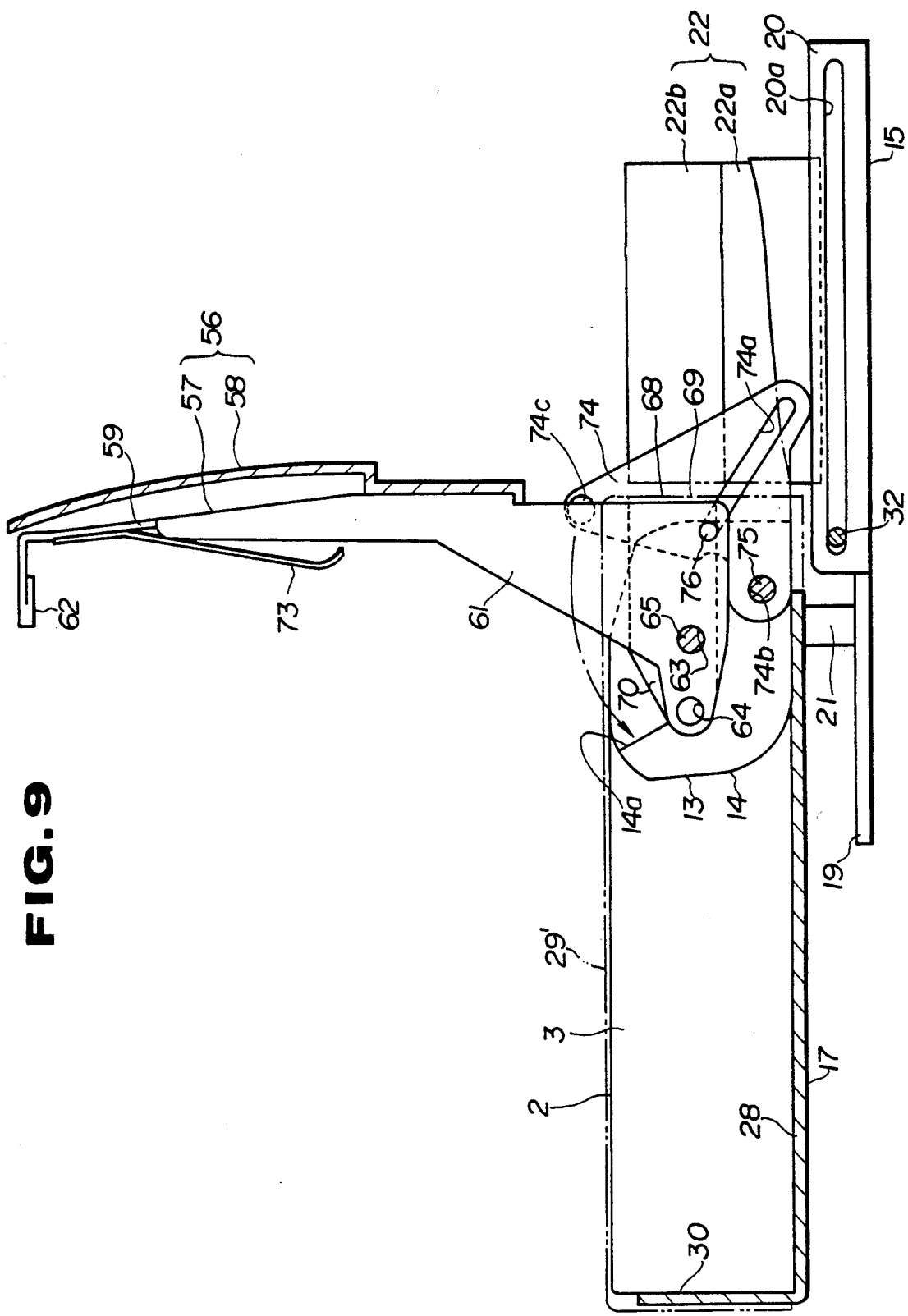
FIG. 9 is an enlarged side view partly in section showing the significant portion of the tape recorder and reproducer machine of the invention with the cassette cover in the open position.

The flat portion 28 of the slidable chassis 17 is formed on one side of the cutout 34 with a guide slot 28c having an open end and provided on the other side of the cutout 34 with a support seat 44 formed therein with a guide groove 44a having an open end. An inclined guide pole 45 is fixed on the flat portion 28 of the slidable chassis 17 near the guide groove 44a. First and second tape loading blocks 46 and 46' are supported slidably on the flat portion 28 of the slidable chassis 17 with pins being held in engagement with the respective guide slots 28c and 44a. The first tape loading block 46 has a guide roller 47 and an inclined movable guide 48. The second tape loading block 46' has a guide roller 47' and an inclined movable guide 48'. Three arms 49, 51 and 53 are rotatably mounted on the slidable chassis 17. The first arm 49 has a pinch roller 50 rotatably mounted at its free end. The second arm 51 has a guide 52 mounted at its free end. The third arm 53 has a pin mounted at its free end. At the extruded position of the slidable chassis 17, these arms are positioned as shown in FIG. 1. The tape cassette 2 is placed in a cassette chamber 55 which contains the first and second tape loading blocks 46 and 46', the inclined guide 45, the pinch roller 50, the guide 52 and the pin 54. A pivotal cassette cover 56, which is comprised of a cover base 57 pivoted on the slide chassis 17 and a cover plate 58 secured to the cover base 57, is rotatable between open and closed positions. At the open position, as shown in FIG. 2, the pivotal cassette cover 56 opens the cassette chamber 55. When the pivotal cassette cover 56 is at its closed position, it closes the cassette chamber 55 and brings the tape cassette 2 into pressure contact with the flat portion 28 of the slidable chassis 17. The cover base 57, which has a rectangular plate member 59, left and right side plates 60 and 61 placed in spaced-parallel relation to each other and a lock piece 62, is formed as a unit from a metal plate. The cover plate 58 is secured on the rectangular plate member 59. Each of the side plates 60 and 61 has a root portion which is a right-angled triangle in shape. The root portion has a through-hole 63 and a support hole 64. The cover base 57 is rotatably supported on the slidable chassis 17 by means of support shafts 65 which extend inward from the respective side portions 29 and 29' of the slidable chassis 17 through the respective through-holes 63 formed in the cover base 57. Rotation of the cover base 57 is limited between the open and closed positions. At the open position, the cover base 57 is in its vertical posture, as shown in FIG. 6. The cover base 57 is in its horizontal posture, as shown in FIG. 8, when it is at the closed position. The side plate 60 of the cover base 57 is formed with an arched slot 60a drawn about the through-hole 63 and provided just above the arched slot 60a with a stopper 60b.

As best shown in FIG. 2, a lock lever 66 is provided to lock the cassette cover 56 at the closed position. The lock lever 66 is supported for sliding movement on the turned front portion 30 of the slidable chassis 17. A tension spring 67 is provided to urge the lock lever 66 to the left, as viewed in FIG. 2. The lock lever 66 has a pawl 66a and an inclined edge 66b. When the cassette cover 56 moves to its closed position, the lock piece 62 of the cover base 57 pushes the inclined edge 66b to bring the lock lever 66 to the right, as viewed in FIG. 2. When the lock piece 62 separates from the inclined edge 66b, the lock lever 66 moves to the left, as viewed in FIG. 2, under the resilient force of the tension spring 67 to bring the pawl 66a into engagement with the lock piece 62. As a result, the cassette cover 56 is locked at its closed position. This locked condition may be released by an appropriate unlock mechanism (not shown).

A protection member 68 is positioned at a protective position between the cassette chamber 55 and the head drum 22 to protect the head drum 22 from damage which may occur when the cassette cover 56 is in its open position allowing the tape cassette 2 to be placed into or discharged from the cassette chamber 55. The protective member 68 moves upward from the protective position to a shunted position with the movement of the cassette cover 56 toward its closed position. The protective member 68 has an elongated protective portion 69, and parallel arm portions 70 turned at the opposite ends of the protective portion 69. The arm portions 70 have pins 71 extending therefrom outward for engagement in the respective support holes 64 so that the protective member 68 can rotate with respect to the cover base 57. One of the arm portions 70 has a spring seat 70a and a projection 70b. A torsion spring 72 is provided to urge the protective member 68 in a clockwise direction, as viewed from the left side of FIG. 5. The torsion spring 72 has a coiled portion 72a journalled on the left pin 71. The torsion spring 72 engages at its one end 72b with the support shaft 65 and at the other end 72c thereof with the spring seat 70a formed on the protective member 68.

When the cassette cover 56 is in its open position, the projection 70b is held in abutment with the stopper 60b of the cover base 57, as shown in FIG. 6, to prevent the clockwise rotation of the protective member 68. In this position, the protective member 68 is integrated with the cover plate 68. At this protective position, the protective portion 69 is positioned substantially at the same height as the upper drum 22b of the head drum 22 and between the head drum 22 and the cassette chamber 55. When the cassette cover 56 moves toward its closed position, the protective member 68 rotates at a speed slower than the speed of rotation of the cassette cover 56 since the protective member 68 rotates about a point 64 different from the point 63 about which the cassette cover 56 rotates and the clockwise rotation of the protective member 68 is limited by the stopper 60b of the cassette cover 56.

Figure 7:
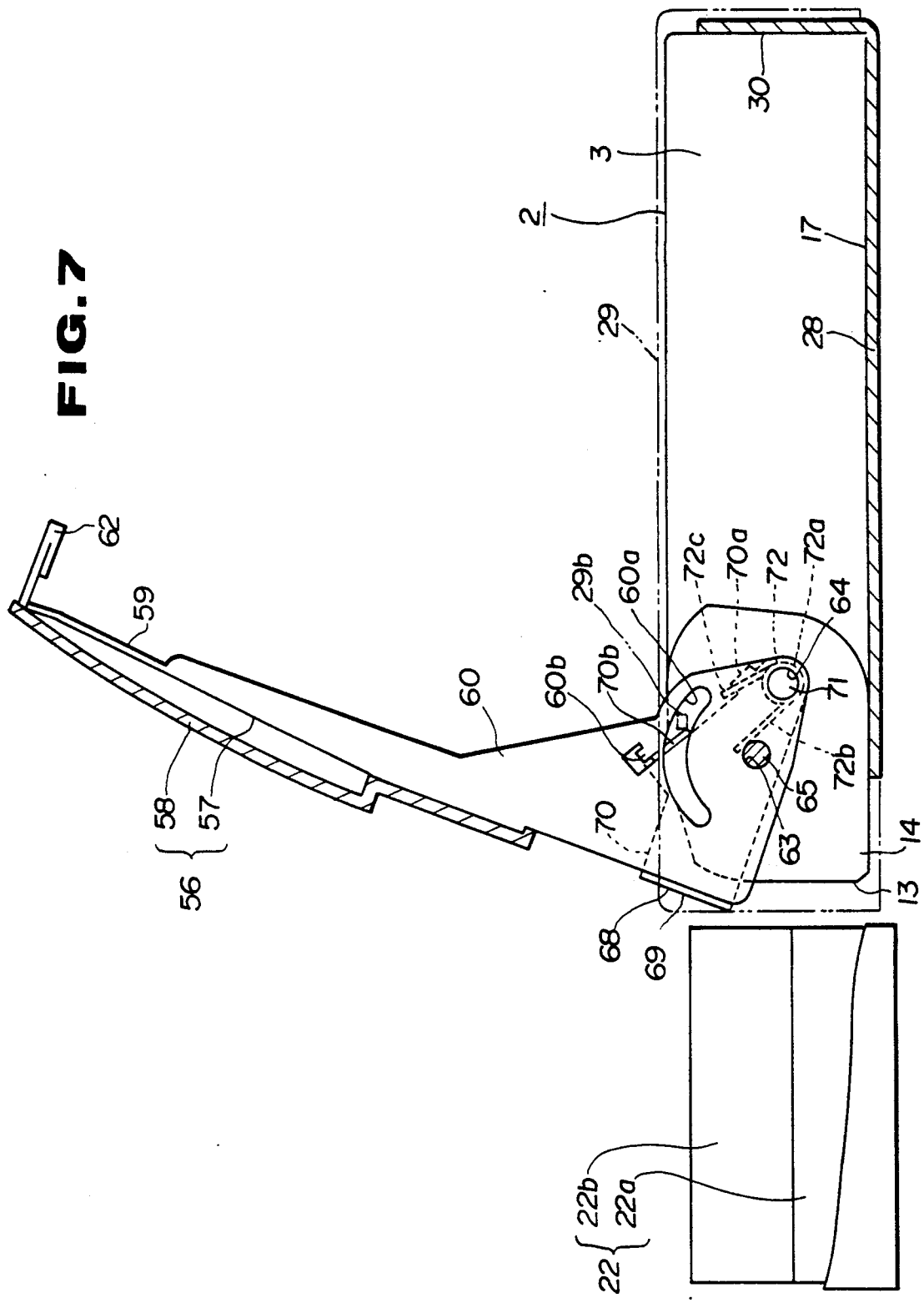
FIG. 7 is an enlarged side view partly in section showing the significant portion of the tape recorder and reproducer machine of the invention with the cassette cover in the intermediate position.

A small projection 29b is formed on the left turned side portion 29 of the slidable chassis 17 and it extends inward through the arched slot 60a formed in the left side plate 60 of the cover base 57. When the cassette cover 56 rotates from its open position (FIG. 6) toward its closed position (FIG. 8), the protective member 68 rotates in the clockwise direction at a speed slower than the speed of rotation of the cassette cover 56. When the cassette cover 56 arrives at an intermediate position (FIG. 7), in the course of the clockwise rotation of the cassette cover 56, the projection 70b comes into abutment with the small projection 29b. When the cassette cover 56 rotates further in the clockwise direction from the intermediate position, the pins 71 rotate about the point at which the projections 70b and 29b are in contact with each other. The position of this point somewhat changes with the rotation of the cassette cover 56. When the cassette cover 56 moves to its closed position, the protective portion 69 moves to its shunted position near the upper surface of the upper drum 22b, as shown in FIG. 8. When the cassette cover 56 rotates in the counter-clockwise direction from its closed position toward its open position, the pins 71 move upward to rotate the protective member 68 in the counter-clockwise direction. When the cassette cover 56 arrives at the intermediate position, the projection 70b starts separating from the projection 29b to permit stopper 60b to push the projection 70b so as to bring the protective member 68 to its protective position.

When the slidable chassis 17 is at its extruded position with the cassette cover 56 is at its open position allowing the tape cassette 2 to be placed into or discharged from the cassette chamber 55, the protective member 68 is placed at the protective position between the cassette chamber 55 and the head drum 22 to protect the head drum 22 from damage which may occur when the tape cassette 2 is placed into or discharged from the cassette chamber 55. The protective member 68 is moved from its protective position to its shunted position when the cassette cover 56 moves from its open position to its closed position.

The rectangular plate member 39 of the cover base 57 has leaf springs 73 secured thereto for urging the cassette casing 3 into pressure contact with the flat portion 28 of the slidable chassis 17 when the cassette cover 56 is in its closed position. A triangle lever 74, which has three apexes, is provided between the right side plate 61 of the cover base 57 and the right arm portion 70 of the protective member 68 for rotating the pivotal door 13 of the tape cassette 2 from its closed position to its open position. The triangle lever 74 has an elongated slot 74a extending near the first apex thereof toward the opposite side, a through-hole 74b formed near the second apex thereof, and a lateral projection 74c formed near the third apex thereof. The right turned side portion 29' has a shaft 75 secured thereon. The shaft 75 extends through the through-hole 74b to rotatably support the triangle lever 74 to the right turned side portion 29' of the slidable chassis 17. A pin 76, which extends from the right side plate 61 of the cover base 57, is inserted slidably in the elongated slot 74a. When the cassette cover 56 is at its open position, the first apex is in abutment with the upper surface of the right turned side portion 20 of the fixed chassis 15 to prevent the cassette cover 56 from rotating further in the clockwise direction. At this position, the pin 76 engages with the upper end of the elongated slot 74a to hold the cassette cover 56 at its open position and prevents the cassette cover 56 from rotating toward its closed position.

Figure 10:
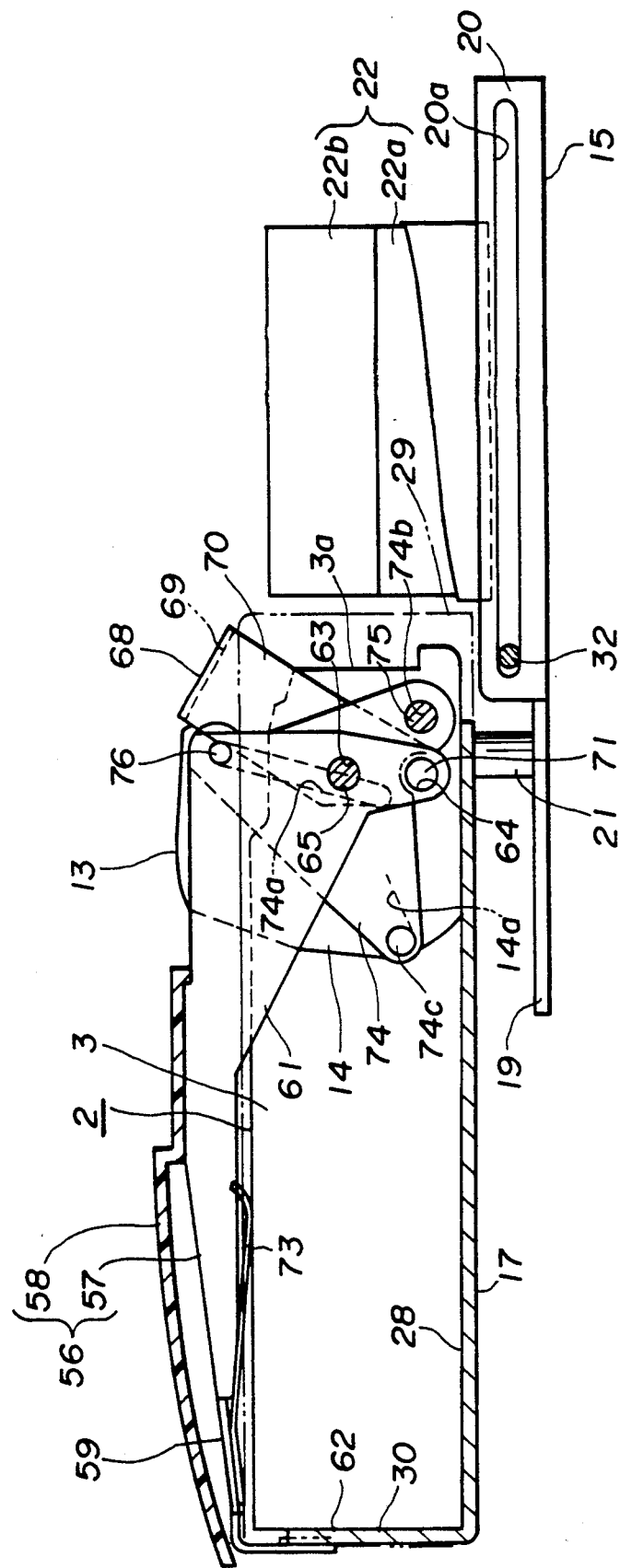
FIG. 10 is an enlarged side view partly in section showing the significant portion of the tape recorder and reproducer machine of the invention with the cassette cover in the closed position.

When the cassette cover 56 rotates toward its closed position, the pin 76 of the cover base 57 pushes one end of the elongated hole 74a to rotate the triangle lever 74 in the counter-clockwise direction. If the tape cassette 2 is placed in the cassette chamber 55, the triangle lever 74 will push the pivotal door 13 of the tape cassette 2 downward with its pin 74c coming into abutment with one side edge of the cutout 14a formed in the pivotal door 13. At the open position, the pivotal door 31 has its uppermost portion placed at a height somewhat higher than the upper surface of the cassette casing 3. When the protective member 68 is at its shunted position, the protective portion 69 is placed near the tip end of the pivotal door 13, as shown in FIGS. 8 and 10. Consequently, the drum protective member 68 cannot be placed at a position higher than the tape cassette 2 even when the protective member 68 moves to its shunted position. This is effective to reduce the size of the video tape recorder and reproducer machine 1 particularly in the direction of the thickness of the tape cassette 2.

When the tape cassette 2 is placed in the cassette chamber 55, the center shaft portions 39 of the first and second spool tables 35 and 36 are inserted into the center bores 12a formed in the hubs 12 of the first and second spools 7 and 8, respectively, so that the first spool 7 can rotate in unison with the first spool table 35 and the second spool 8 can rotate in unison with the second spool table 36. Connection pins 43 are inserted in the elongated holes 9a of the respective spool support plates 9 so that the first lever 40 can move in unison with the first spool support plate 9 on which the first spool 7 is supported and the second lever 41 can move in unison with the second spool support plate 9 on which the second spool 8 is supported. When the tape cassette 2 is placed in the cassette chamber 55, the guide rollers 47 and 47', the inclined movable guides 48 and 48', the pinch roller 50, the guide 52 and the pin 54 are placed inside of the magnetic tape 6 extending along the front edge 3a of the cassette casing 3. When a command is produced to retract the slidable chassis 17, the slidable chassis 17 is moved toward its retracted position after the first and second levers 40 and 41 are moved, along with the respective spool support plates 9, to the second position (FIG. 4) where the distance between the first and second spools 7 and 8 is somewhat longer than the distance standardized for 8 mm video tape cassettes. By this movement, the head drum 22 is inserted into the mouth portion 11 of the cassette casing 3 with its front end being placed between the first and second spools 7 and 8. A portion of the magnetic tape 6 is transported around the head drum 22, the guide rollers 47 and 47', the fixed tape guide 27, the inclined guide 45 and the capstan 25. When the slidable chassis 17 arrives at its retracted position, the left and right guide slots 28c formed in the slidable chassis 17 are connected to the respective guide slots 26a formed in the guide member 26 provided on the fixed chassis 15 and the guide groove 44a of the slidable chassis 17 is connected to the guide groove 26'a of the fixed chassis 15. This permits the left loading block 46 to move along the guide grooves 28c-26a to a loading position behind the head drum 22 and the right loading block 46' along the guide grooves 44a-26'a to a loading position behind the head drum 22. When the slidable chassis 17 starts moving toward the retracted position, a freedom arm 51 is rotated, by means of a guide cam (not shown) provided on the fixed chassis 15, to loop the magnetic tape 6 around the guide 52. The arm 53 is released from its initial position and urged into resilient contact with the magnetic tape 6 under the resilient force of a the tension spring (not shown). A cam mechanism (not shown) is actuated to rotate the pinch roller 49 to push the magnetic tape 6 against the capstan 25 just before the slidable chassis 17 arrives at its retracted position. When the tape loading is completed, the magnetic tape 6 is transported from the first spool 7 to the second spool 8 around the left guide 5, the pin 54, the fixed tape guide 27, the guide roller 47, the inclined movable guide 48, the head drum 22, the inclined movable guide 48', the guide roller 47', the inclined fixed guide 45, the capstan 25, the guide 52, and the right guide 47' in this order. The magnetic tape 6 is transported by the capstan 25, the pinch roller 50 and the head drum 22.

The numeral 77 designates a swinging lever provided substantially at the center of the flat portion 19 of the fixed chassis 15. The swinging lever 77 has a idle gear 78 to which the rotation of the capstan motor 24 is transmitted. When the magnetic tape 6 is transported in a normal direction from the first spool 7 to the second spool 8, the idle gear 78 comes into mesh engagement with the spur gear portion 37 of the second spool table 36 to rotate the second spool table 36 in the tape winding direction. When the magnetic tape 6 is transported in the direction opposite to the normal direction, the idle gear 78 comes into mesh engagement with the spur gear portion 37 of the first spool table 35 to rotate the first spool table 35 in the tape winding direction.

When the tape cassette 2 is discharged from the cassette chamber 55, the slidable chassis 17 is moved to its extruded position and the magnetic tape 6 is unloaded. In this case, the slidable chassis 17 is moved to its extruded position after the tape loading blocks 46 and 46' are moved above the guide grooves 28c and 44a. This movement causes the head drum 22 to be discharged from the mouth portion 11 of the tape cassette 2 and the pinch roller 50, the guide 52 and the pin 54 to be returned to their initial positions. At the same time of movement of the tape loading blocks 46 and 46', the first spool 7 is rotated to wind up the magnetic tape 6 therearound with no slack.

While the invention has been described in connection with a tape recorder and reproducer machine standardized for 8 mm video tape cassettes, it is to be understood that the invention is equally applied to tape recorder and reproducer machines standardized for other video tapes and audio tapes. While the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A tape recorder and reproducer machine including a rotatable head drum carrying a plurality of heads for recording a signal onto a cassette-type magnetic tape and for reproducing the signal recorded on a cassette-type magnetic tape, said machine comprising:
   a cassette chamber for receipt of a tape cassette;
   a protective member movable between first and second positions; and
   drive means separate from the tape cassette for moving said protective member to the first position between said cassette chamber and said head drum to protect said head drum from damage while the tape cassette is being placed into or discharged from said cassette chamber and for moving said protective member from the first position to the second position allowing access to said head drum by the magnetic tape after the tape cassette is properly received in said cassette chamber.

2. The tape recorder and reproducer machine as claimed in claim 1 further comprising a cover movable between a closed position closing said cassette chamber and an open position uncovering said cassette chamber, and wherein said drive means is associated with said cover for moving said protective member to the first position when said cover moves to the open position and for moving said protective member to the second position when said cover moves to the closed position.

* * * * *